May 6, 1958 R. C. SACKSTEDER 2,833,504
ADJUSTABLE WEIGHT SUPPORTING MECHANISM
Filed May 17, 1954 2 Sheets-Sheet 2
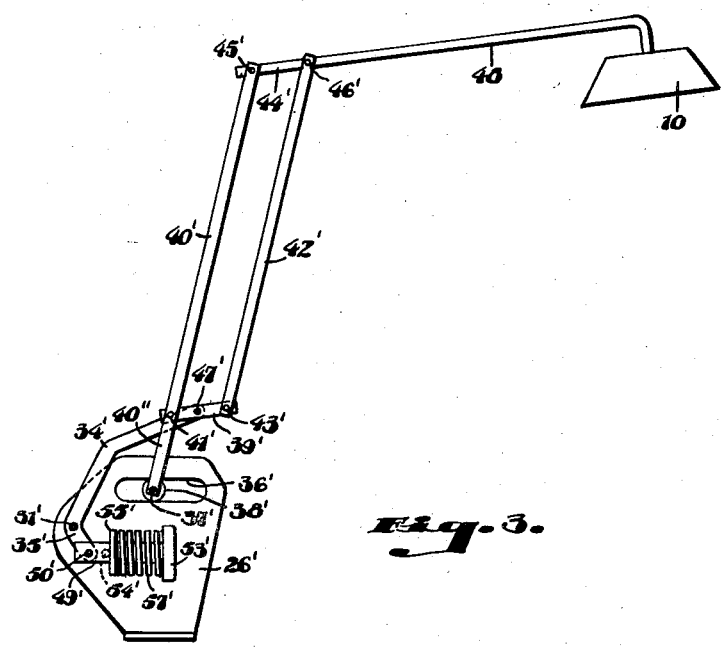
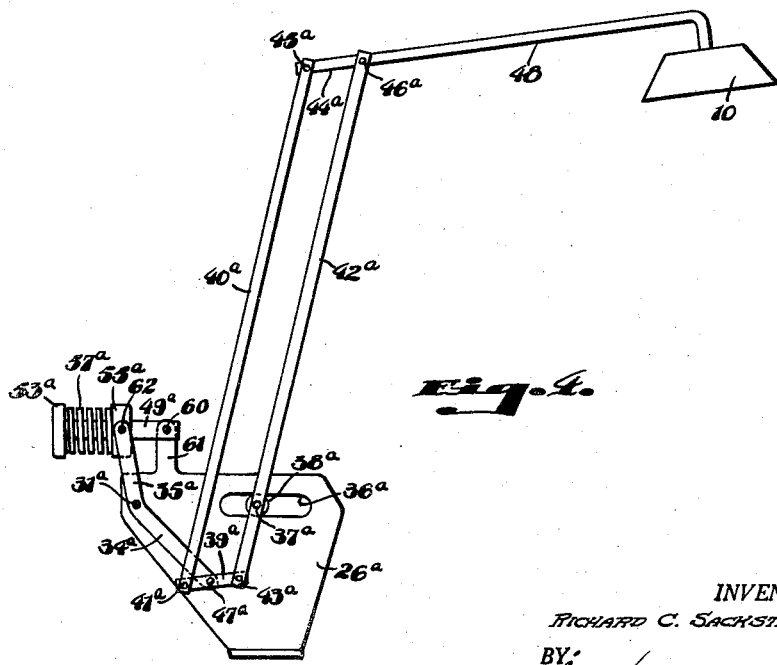
INVENTOR.
RICHARD C. SACKSTEDER,
BY: Harold B Hood.
ATTORNEY.

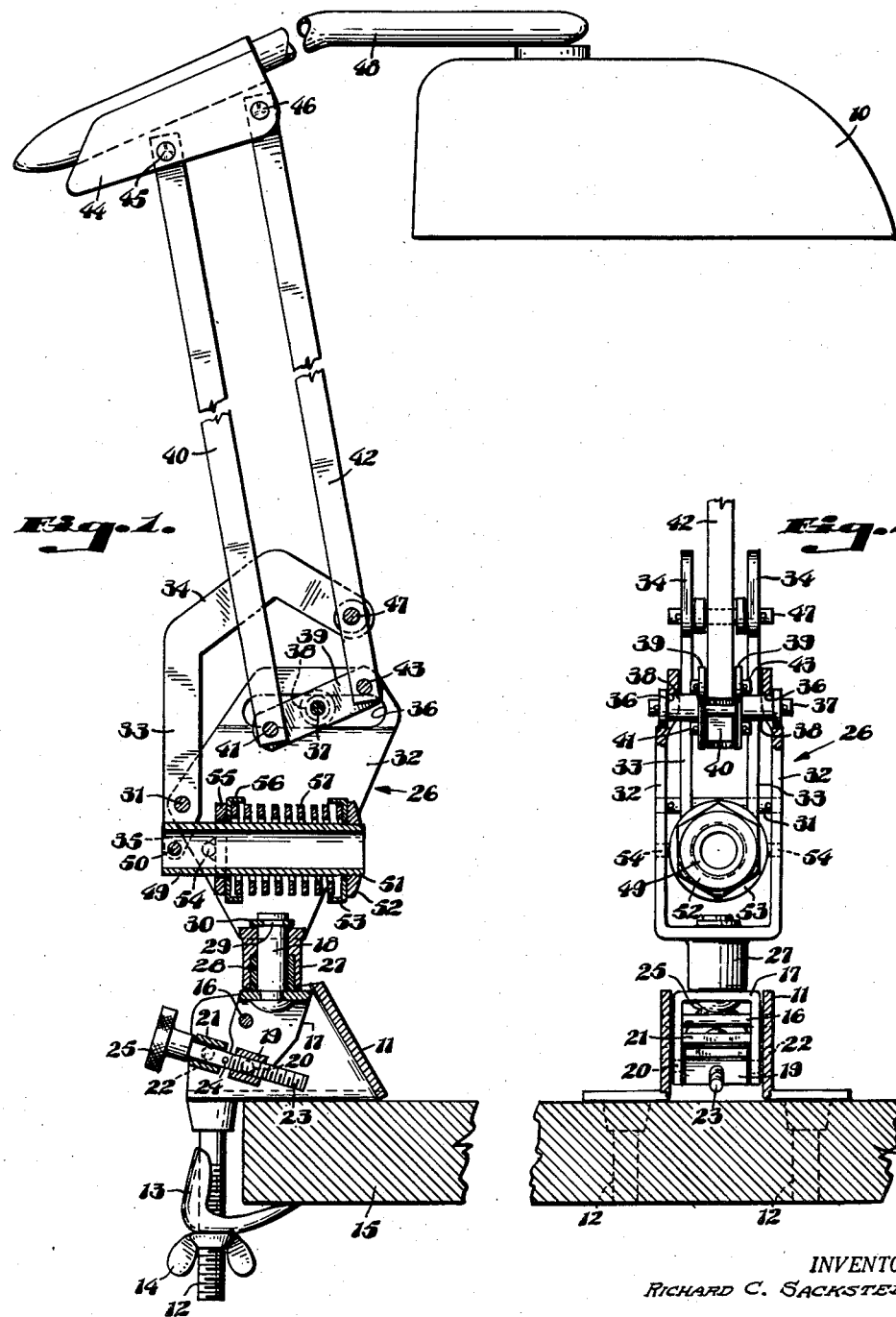

United States Patent Office 2,833,504
Patented May 6, 1958

2,833,504

ADJUSTABLE WEIGHT SUPPORTING MECHANISM

Richard C. Sacksteder, Elwood, Ind., assignor to General Lamps Manufacturing Corporation, Elwood, Ind., a corporation of Indiana Application May 17, 1954, Serial No. 430,021

4 Claims. (Cl. 248—280)

The present invention relates to an adjustable weight supporting mechanism, and the primary object of the invention is to provide a mechanism through which a load may be supported, under conditions of substantial equilibrium, in any selected position within the range of movement or adjustability of the mechanism. The invention finds utility in supporting a lamp, and it will be described, and has been illustrated, in that capacity, though it will be recognized, of course, that the mechanism is adapted, as well, to support any other device which, in use, may desirably be positioned in any one of a multiplicity of relationships to the foundation from which it may be ultimately supported.

A primary object of the invention is to provide a device of the character described which shall be relatively simple in construction, inexpensive to manufacture, quite free from mechanical breakdown, easy to move, and yet inherently stable in any position of adjustment within its range.

Further objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

Fig. 1 is a side elevation of a preferred embodiment of my invention, parts being broken away and parts being shown in section for clarity of illustration;

Fig. 2 is a fragmental elevation, viewed from the right of Fig. 1, with parts broken away;

Fig. 3 is a diagrammatic illustration of a modified form of my invention; and

Fig. 4 is a similar illustration of a further modified form thereof.

Referring more particularly to the drawings, it will be seen that I have illustrated a lamp 10 as the load or weight to be supported by the adjustable mechanism of my invention. In its preferred embodiment, such mechanism includes a base 11 provided with a pair of depending, threaded stems 12, upon each of which is sleeved a gripper 13 under the domination of a wing nut 14 threaded on the associated stem 12, whereby the base may be clamped to a table top or other support 15.

As shown, a trunnion 16 spans the opposite, upstanding walls of the base 11 and provides a pivotal support for a carriage 17 upon which is fixedly mounted an upstanding post 18. A nut 19 is mounted, between the side walls of the carriage 17, to oscillate upon a pair of studs 20; while a collar 21 is mounted, upon studs 22 carried by the side walls of the base 11, to oscillate upon a parallel axis. A screw 23 is journalled in the sleeve 21 and threadedly penetrates the nut 19, said screw being held against axial movement relative to the sleeve 21 by means of a pin 24 engaging the inner end of said sleeve, and a knurled knob 25 engaging the outer end of said sleeve.

Obviously, rotation of the screw 23 in one direction or the other will swing the carriage 17, in one direction or the other, about the axis of the trunnion 16 to adjust the post 18 to a truly vertical position, in spite of any slight departure of the support 15 from the horizontal.

A bracket, indicated generally by the reference numeral 26, is formed to provide, at its lower end, a cylindrical portion 27 bored to receive the post 18. Preferably, a bushing 28 is mounted in the lower end of bracket portion 27 to provide a good bearing on the post 18. As shown, the upper end of the post 18 is grooved, as at 29, to receive a spring ring 30 which holds the bracket 26 against accidental removal from the post. It will be seen that the bracket 26 is thus mounted for rotation about a vertical axis.

A trunnion 31 spans the laterally-spaced, upstanding side walls 32, 32 of the bracket 26 and provides a pivotal axis upon which a lever 33 is mounted to swing. As shown, the lever 33 is so supported upon the trunnion 31 as to have a long, generally upwardly extending arm 34 and a short, generally downwardly extending arm 35.

At a level above the trunnion 31, the walls 32, 32 of the bracket are formed with corresponding slots 36, 36, each of which defines a generally horizontal, downwardly facing retaining surface. An axle 37 carries two rollers 38, 38 which rollers are received in the respective slots 36, 36 and engage the said downwardly facing surfaces.

A rocker element, which comprises the two pieces 39, 39, is pivotally mounted upon the axle 37 which, with its rollers 38, 38 comprises a fulcrum means which is mounted for transaxial movement in the guideway 36, 36; and it will be seen that the path of movement of said fulcrum means is offset both vertically and horizontally from the pivotal axis defined by the trunnion 31.

A link 40 has one end pivoted at 41 upon that end of the rocker element 39 nearer the trunnion 31; and a second link 42 has one end pivotally connected, at 43, to that end of the rocker element 39 more remote from the trunnion 31. In the illustrated embodiment of the invention, the pivotal connections 41 and 43 are about equidistant from the axle 37.

A second rocker element 44 is pivotally connected at 45 to the other end of link 40, and is pivotally connected at 46 to the other end of link 42. The pivotal connections 45 and 46 are spaced apart a distance equal to the distance between the pivotal connections 41 and 43, so that the rocker elements 39 and 44 and the link elements 40 and 42 cooperate to define a parallelogram.

The remote end of the long lever arm 34 is pivotally connected at 47 to the link 42 at a point near the pivotal connection 43.

An arm 48 is suitably supported in the rocker element 44, and carries the lamp 10 (or other load to be supported) at its outer end.

A member which, in the illustrated embodiment of the invention, comprises a hollow rod 49, is pivoted at 50 to the short arm 35 of the lever 33. The remote end of the rod 49 is threaded, as at 51, for the reception of a nut 52 which adjustably engages and supports a seat 53. At a point between the threaded end of the rod 49 and the vertical plane including the axis of the trunnion 31, the walls 32 of the bracket 26 support a pair of aligned studs 54 against which bears an abutment ring 55 sleeved on the rod 49 and supporting a seat 56. A coiled spring 57 is confined between the seats 53 and 56 and resiliently resists clockwise movement of the lever 34.

When the above-described parts are proportioned and arranged according to the relation defined hereinbelow, the spring 57 will exert upon the point 47 a force having a vertically-upward component which exactly counterbalances the downward component of the force exerted upon the same point from the supported load, and the system will be in equilibrium.

Though all pivot points are designed and arranged to permit relatively free movement of the parts thereabout, there is sufficient friction in the system to compensate for slight variations from mathematically exact equilibrium. However, the system is so designed that the following relations between the parts are maintained:

(1) The length of the lever arm between points 43 and 47 multiplied by the product of the lever arm between points 31 and 50 and the distance between 31 and 54 and by the spring constant in pounds per inch is equal to the lever arm between points 47 and 31 multiplied by the moment of the system about point 37 where the angle between the vertical and the line joining points 37 and 43 is 180° and the angle between the vertical and the line joining the points 43 and 47 is 90°.

(2) The lever arm from 37 to 43 multiplied by the product of the lever arm from 31 to 50, and the distance between 31 and 54 and by the spring constant is equal to the lever arm from 31 to 47 multiplied by the moment of the system about point 37 if the angle included between the vertical and a line joining points 37 and 43 is 90° and the line joining points 43 and 47 is vertical.

(3) The system should be designed in such a way that the angle between the line connecting 47 and 31 and the vertical is equal to the angle between the line 50—31 and the line 31—54.

It will be obvious that a number of variations in the specific linkage as illustrated in Figs. 1 and 2 are possible, within the scope of the invention; and I have illustrated, more or less diagrammatically, two such variations. Thus, in Fig. 3, the bracket 26' supports a trunnion 31' upon which is swingably mounted a lever corresponding to the lever 33 and comprising a long, generally upwardly extending arm 34' and a short, generally downwardly extending arm 35'. The bracket 26' is formed with guideways 36' in which a fulcrum 37' is transaxially guided for substantially horizontal movement. An extension 40" of the link 40' is pivotally mounted upon the fulcrum 37'. Said link 40' is pivotally connected at 41' to that end of the rocker member 39' closer to the trunnion 31'. A link 42' is pivotally connected at 43' to the opposite end of the rocker 39'; and the remote ends of the links 40' and 42' are pivotally connected, at 45' and 46', to an upper rocker 44' upon which is carried the arm 48 which supports the load 10.

A rod 49' is pivotally connected at 50' to the lever arm 35', and a spring 57' cooperates with the rod 49' precisely in the manner in which the spring 57 cooperates with the rod 49, being confined between a seat 53' fixed to said rod and a seat 55' bearing against the stops 54'.

In the modification illustrated in Fig. 4, the bracket 26a is shaped somewhat differently from the bracket 26; but it supports a trunnion 31a upon which is journalled a lever having a long, generally downwardly projecting arm 34a and a short, generally upwardly projecting arm 35a. The bracket 26a provides a guideway 36a in which a fulcrum 37a is guided for transaxial, generally horizontal movement.

A rocker 39a is pivotally mounted upon the extremity of the lever arm 34a, as at 47a; and links 40a and 42a are pivotally connected, as at 41a and 43a, to the opposite ends of the rocker 39a. The upper ends of the links 40a and 42a are pivotally connected, as at 45a and 46a, to an upper rocker 44a which supports the arm 48 upon which is carried the load 10. In this form of the invention, the link 42a is pivotally supported, at a point near the pivotal connection 43a, from the fulcrum 37a.

A rod 49a is pivotally connected at 60 to a portion 61 of the bracket 26a, and a coiled spring 57a is sleeved on said rod, being confined between the abutment element 53a which is fixed to the rod 49a and the abutment element 55a which is slidably sleeved on the rod, and to which the lever arm 35a is pivotally connected, as at 62.

I claim as my invention:

1. A mechanism of the class described, comprising means providing a fixed, generally horizontal pivotal axis, a lever mounted to swing about said axis, means providing a generally horizontal guideway spaced from said axis and extending transversely with respect thereto, fulcrum means providing an axis substantially parallel with said pivotal axis and guided for trans-axial movement along said guideway, said fulcrum means being horizontally offset from said pivotal axis, four elements defining a parallelogram and comprising a first rocker element, a second rocker element in parallel, spaced relation to said first rocker element, a first link element pivotally connected to said first rocker element and to said second rocker element, and a second link element in parallel, spaced relation to said first link element and pivotally connected to said first rocker element and to said second rocker element, one of said four elements being pivotally supported from said fulcrum means, means providing a pivotal connection between said lever and another of said four elements adjacent said one element, means for supporting a load from a third one of said four elements, and means operatively engaging said lever and yieldably resisting movement of said lever under the influence of gravity upon such a load.

2. A mechanism of the class described, comprising means providing a fixed, generally horizontal pivotal axis, a lever mounted to swing about said axis, means providing a generally horizontal guideway spaced from said axis and extending transversely with respect thereto, fulcrum means providing an axis substantially parallel with said pivotal axis and guided for transaxial movement along said guideway, said fulcrum means being horizontally offset from said pivotal axis, four elements defining a parallelogram and comprising a lower rocker element, an upper rocker element in parallel, spaced relation to said lower rocker element, an inner link element pivotally connected to said lower rocker element and to said upper rocker element, an outer link element in parallel, spaced relation to said inner link element and pivotally connected to said lower rocket element and to said upper rocker element at points respectively more remote from said pivotal axis than the points of connection of said inner link element to said rocker elements, said lower rocker element being pivotally supported from said fulcrum means, means providing a pivotal connection between said lever and said outer link element, means for supporting a load from said upper rocker element, and means operatively connected to said lever and yieldably resisting movement of said lever under the influence of gravity upon such a load.

3. A mechanism of the class described, comprising means providing a fixed, generally horizontal pivotal axis, a lever mounted to swing about said axis, means providing a generally horizontal guideway spaced from said axis and extending transversely with respect thereto, fulcrum means providing an axis substantially parallel with said pivotal axis and guided for transaxial movement along said guideway, said fulcrum means being offset from said pivotal axis, four elements defining a parallelogram and comprising two parallel, vertically-separated elements and two parallel, horizontally-separated elements, each of said horizontally-separated elements being pivotally connected to both of said vertically-separated elements, one of said four elements being pivotally connected to said fulcrum means, means providing a pivotal connection between said lever and another of said four elements adjacent said one element, means for supporting a load from a third of said four elements, a member pivotally connected to said lever, abutment means carried by said member at a point remote from the point of connection of said member to said lever, abutment means fixed with respect to said pivotal axis and disposed between said point of connection and said first-named abutment means, and a coiled spring sleeved on said member and confined between said abutment means.

4. A mechanism of the class described, comprising means providing a fixed, generally horizontal pivotal axis, a lever pivotally supported intermediate its ends upon said means to swing about said axis and having a long arm and a short arm, means providing a generally horizontal guideway spaced from said axis and extending transversely with respect thereto, fulcrum means providing an axis substantially parallel with said pivotal axis and guided for transaxial movement along said guideway, said fulcrum means being vertically offset from said pivotal axis, four elements defining a parallelogram and comprising two parallel, vertically-separated elements and two parallel, horizontally-separated elements, each of said horizontally-separated elements being pivotally connected to both of said vertically-separated elements, one of said four elements being pivotally connected to said fulcrum means, means providing a pivotal connection between the long arm of said lever and another of said four elements adjacent said one element, means for supporting a load from a third of said four elements, a member pivotally connected to the short arm of said lever and projecting therefrom at an angle to a line joining said pivotal axis with the point of connection of said member to said lever, abutment means carried by said member at a point remote from said point of connection, abutment means fixed with respect to said pivotal axis and disposed between said point of connection and said first-named abutment means, and a coiled spring sleeved on said member and confined between said abutment means.

References Cited in the file of this patent

UNITED STATES PATENTS

| | | |
|---|---|---|
| Re. 12,674 | Marten | July 23, 1907 |
| 2,076,446 | Carwardine | Apr. 16, 1937 |
| 2,200,518 | Perbal | May 14, 1940 |
| 2,547,532 | Mendelsohn | Apr. 3, 1951 |